United States Patent [19]

Brownlee

[11] Patent Number: 5,011,354
[45] Date of Patent: Apr. 30, 1991

[54] CONCRETE FASTENER APPARATUS

[76] Inventor: Ritch J. Brownlee, 4129 328th Pl. SE, Fall City, Wash. 98024

[21] Appl. No.: 486,294

[22] Filed: Feb. 28, 1990

[51] Int. Cl.⁵ ............................................. F16B 15/00
[52] U.S. Cl. .................................. 411/439; 411/447; 411/451; 411/452; 411/456; 411/482; 411/922; 411/923; 411/487
[58] Field of Search ............... 411/456, 475, 482, 487, 411/493, 498, 446, 447, 451, 473, 474, 439, 922, 508, 453, 452, 494, 923

[56] References Cited

U.S. PATENT DOCUMENTS

| | | | |
|---|---|---|---|
| 822,577 | 6/1906 | Brooks | 411/456 X |
| 1,427,953 | 9/1922 | Harrison | 411/456 X |
| 1,561,518 | 11/1925 | Graham | 411/474 X |
| 1,638,671 | 8/1927 | Wagner | 411/456 X |
| 1,733,008 | 10/1929 | Foos | 411/456 |
| 1,767,565 | 6/1930 | Thrift et al. | 411/482 X |
| 2,094,849 | 10/1937 | Schneider | 411/482 X |
| 2,307,348 | 1/1943 | Anderson | 411/487 |
| 4,932,820 | 6/1990 | Schniedermeier | 411/482 X |

FOREIGN PATENT DOCUMENTS 428420 5/1935 United Kingdom ................ 411/456

Primary Examiner—Rodney M. Lindsey
Attorney, Agent, or Firm—Leon Gilden

[57] ABSTRACT

A fastener for use particularly to temporarily secure wood strip members to a concrete substrate includes an upper cylindrical head overlying a first cylindrical shank, with a truncated conical further head coaxially aligned with the cylindrical head, with a second shank positioned between the further head and an elliptical, deformable anchor portion including a third shank underlying the anchor portion. The anchor portion is deformable to enhance securement of the fastener within the concrete substrate, and wherein further the cylindrical head and the further head define a gap therebetween to enable removal of the fastener by application of a tool to the first shank.

1 Claim, 4 Drawing Sheets

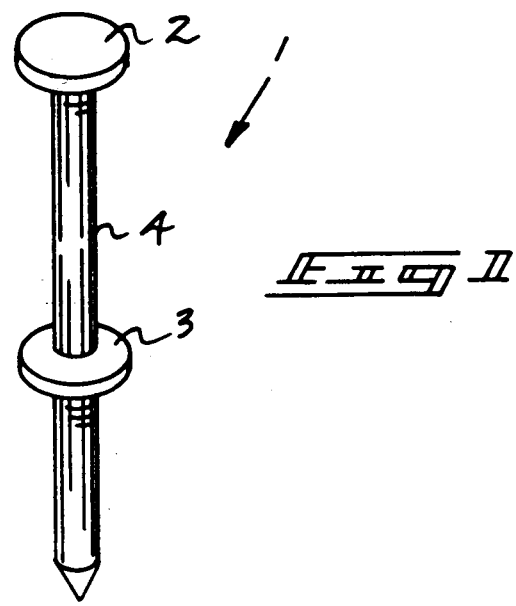
Fig 1
PRIOR ART
Fig 2
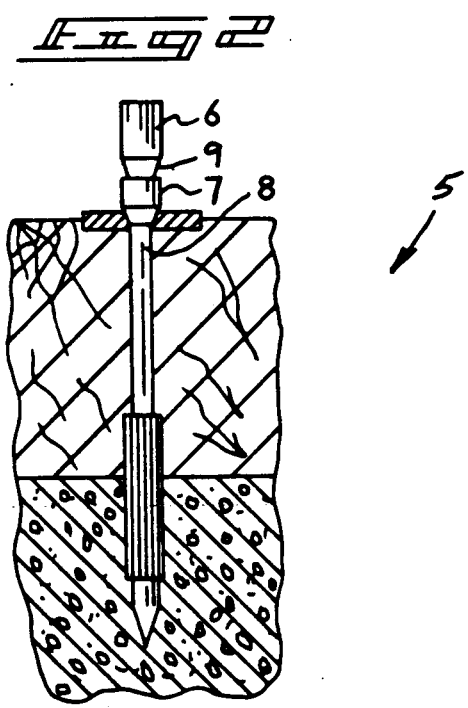
PRIOR ART

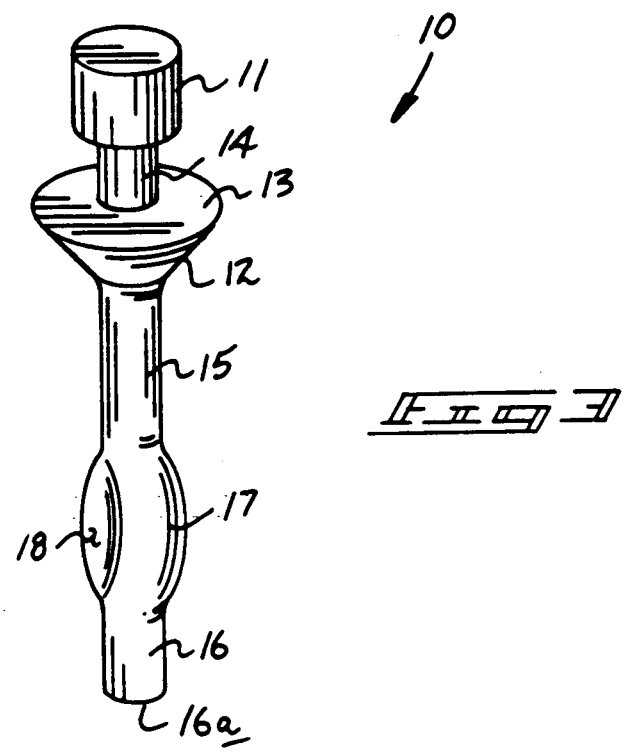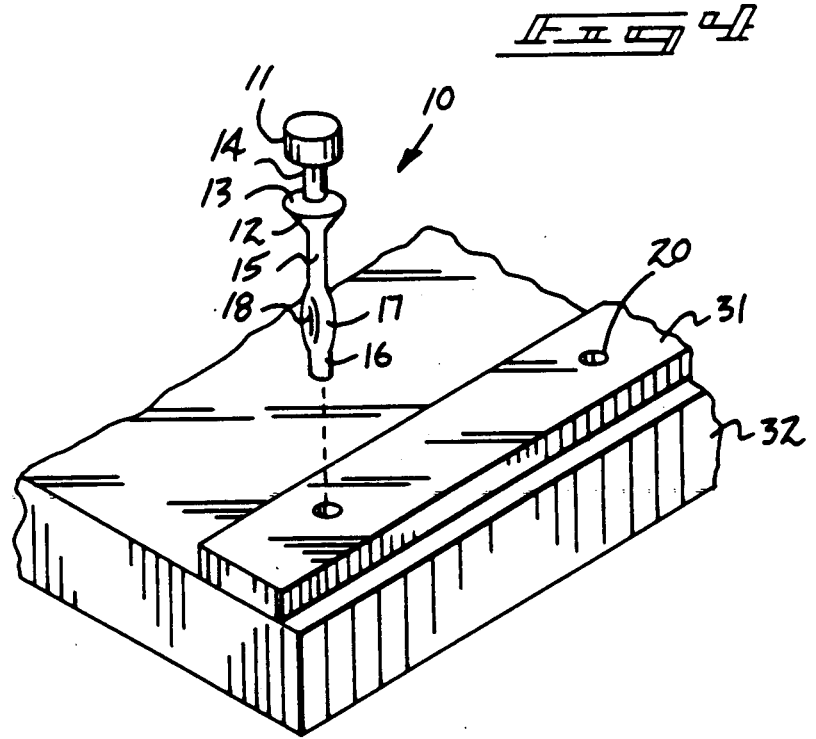

CONCRETE FASTENER APPARATUS

BACKGROUND OF THE INVENTION

1. Field of the Invention

The field of invention relates to fastener apparatus, and more particularly pertains to a new and improved concrete fastener wherein the same permits temporary securement of a wooden plate member to an underlying concrete substrate.

2. Description of the Prior Art

Fastener apparatus, and particularly concrete fasteners, are available in the prior art. Heretofore, however, the prior art has directed the fastener organizations for a relatively permanent association of various portions in concrete fabrication. The instant invention attempts to overcome disadvantages of the prior art by utilizing a concrete fastener structure configured for subsequent removal. Examples of the prior art include U.S. Pat. No. 2,575,079 to Temple utilizing stacked head portions, wherein the top portion is configured with a weakening groove between the top and bottom head portion to permit removal of the top head portion.

U.S. Pat. No. 1,765,729 to Morte provides for a nail member with spaced heads, with a shank therebetween to enable spacing of a structural member in a spaced relationship relative to the bottom head portion of the nail organization.

U.S. Pat. No. 767,520 to Hurd provides for a nail construction with a shank, including a tapered lower end and a head member providing a projection head overlying the head member.

U.S. Pat. No. 4,781,508 to Schroeder, et al., provides for a nail construction, including a fluted member for use in dry wall construction, wherein the fluted head includes webs directed downwardly from the head adjacent the shank of the nail.

U.S. Pat. No. 1,897,335 to Riedel, et al., sets forth a corrugated nail fastener wherein the shank extends above a concave flange, wherein the flange is positioned to secure a corrugated plate over a support surface.

As such, it may be appreciated that there continues to be a need for a new and improved concrete fastener wherein the same addresses both the problems of ease of application into a concrete support surface, as well as effectiveness in construction to enable subsequent removal of the fastener and in this respect, the present invention substantially fulfills this need.

SUMMARY OF THE INVENTION

In view of the foregoing disadvantages inherent in the known types of concrete fasteners now present in the prior art, the present invention provides a concrete fastener provided with spaced head members to permit ease of subsequent removal of the fastener. As such, the general purpose of the present invention, which will be described subsequently in greater detail, is to provide a new and improved concrete fastener which has all the advantages of the prior art concrete fasteners and none of the disadvantages.

To attain this, the present invention includes a fastener for use particularly to temporarily secure wood strip members to a concrete substrate including an upper cylindrical head overlying a first cylindrical shank, with a truncated conical further head coaxially aligned with the cylindrical head, with a second shank positioned between the further head and an elliptical, deformable anchor portion including a third shank underlying the anchor portion. The anchor portion is deformable to enhance securement of the fastener within the concrete substrate, and wherein further the cylindrical head and the further head define a gap therebetween to enable removal of the fastener by application of a tool to the first shank.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved concrete fastener which has all the advantages of the prior art concrete fasteners and none of the disadvantages.

It is another object of the present invention to provide a new and improved concrete fastener which may be easily and efficiently manufactured and marketed.

It is a further object of the present invention to provide a new and improved concrete fastener which is of a durable and reliable construction.

An even further object of the present invention is to provide a new and improved concrete fastener which is susceptible of a low cost of manufacture with regard to both materials and labor, and which accordingly is then susceptible of low prices of sale to the consuming public, thereby making such concrete fasteners economically available to the buying public.

Still yet another object of the present invention is to provide a new and improved concrete fastener which provides in the apparatuses and methods of the prior art some of the advantages thereof, while simultaneously overcoming some of the disadvantages normally associated therewith.

Still another object of the present invention is to provide a new and improved concrete fastener wherein the same is securely anchored into a concrete substrate, but configured for ease of subsequent removal from the substrate.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of a prior art nail construction.

FIG. 2 is an orthographic view taken in elevation of a prior art concrete fastener organization.

FIG. 3 is an isometric illustration of the instant invention.

FIG. 4 is an isometric illustration of the instant invention securing a board member to a concrete substrate.

DESCRIPTION OF THE PREFERRED EMBODIMENT

Figure 5:
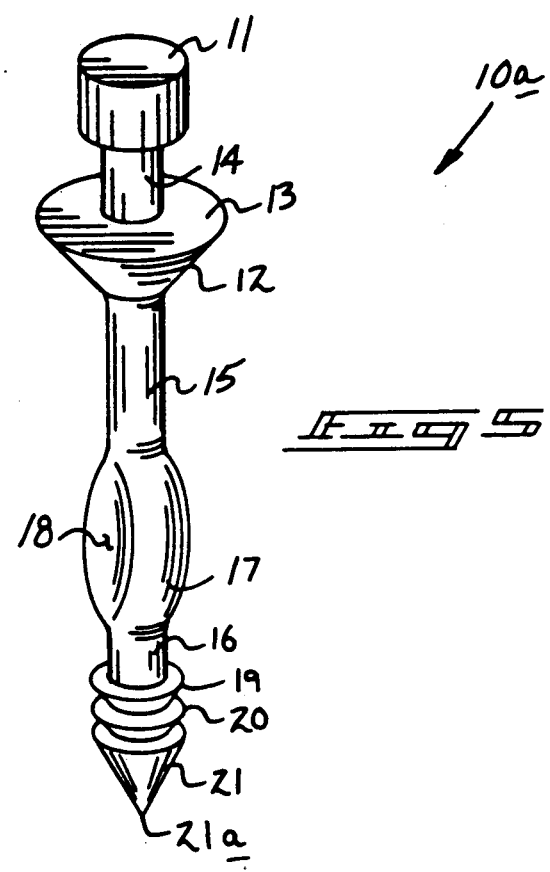
FIG. 5 is an isometric illustration of a modification of the instant invention.

With reference now to the drawings, and in particular to FIGS. 1 to 8 thereof, a new and improved concrete fastener embodying the principles and concepts of the present invention and generally designated by the reference numerals 10, 10a, 10b, and 10c will be described.

FIG. 1 illustrates a prior art fastener 1 utilizing a head member 2 spaced from a lower head member 3, with a cylindrical shank 4 integrally mounted to a bottom surface of the upper head member 2 and coaxially directed through the lower head member 3 to provide for spacing structural members on an upper surface of the head member 2. FIG. 2 illustrates a further prior art fastener 5, wherein the fastener 5 includes an upper head 6, with a tapered center section overlying a lower head 7, wherein a conical weakening member 9 defines a weakening groove between the upper and lower heads to enable removal of the upper head member.

More specifically, the concrete fastener 10 of the instant invention essentially comprises a first cylindrical head 11 coaxially aligned with an inverted second head defined by a truncated conical configuration coaxially aligned underlying the first head, including a planar annular upper surface 13, with a first cylindrical shank 14 defining a spacing between a bottom surface of the first head 11 and the upper surface 13. The first cylindrical shank, the second cylindrical shank underlying the second head, and a third cylindrical shank 16 spaced from the second cylindrical shank by a deformable elliptical anchor member 17 are all coaxially aligned and of a diameter less than that of the first cylindrical head. Preferably the first cylindrical head 11 defines a diameter substantially twice that of the first, second, and third cylindrical shanks 14, 15, and 16 respectively. The deformable elliptical anchor member 17 extends beyond the second and third cylindrical shanks and includes spaced elliptical concavities 18 directed through opposing sides of the anchor member 17. The anchor member 17 is defined by a width substantially equal to the diameter of the cylindrical shank construction. The second head 12, and its associated planar annular upper surface 13, is defined by a diameter greater than that of the first cylindrical head 11. The third cylindrical shank 16 includes a blunt, lower terminal end 16a aligned orthogonally relative to the axis of the fastener member 10.

Reference to FIG. 4 illustrates the use of the fastener member, wherein pre-drilled holes 20 are directed through a wood stringer or the like 31 overlying a concrete substrate 32. Upon directing of the fastener 10 therewithin, the anchor member 17 is deformable to anchor the fastener 10 within the bore 20. The tapered exterior conical surface of the second head 12 provides an anchoring abutment surface for limiting depth of travel of the member 10 within the stringer 31. The bottom surface of the first head 11 provides a convenient resistance for subsequent removal of the anchor member 10.

FIG. 5 illustrates a modified fastener 10a, wherein the lower terminal end of the third shank 16 includes a first and second truncated conical anchor 19 and 20 respectively, coaxially aligned relative to one another in an inverted configuration terminating in a conical terminal end member 21 terminating in an apex 21a to assist in directing of the fastener through members to be assembled.

Figure 6:
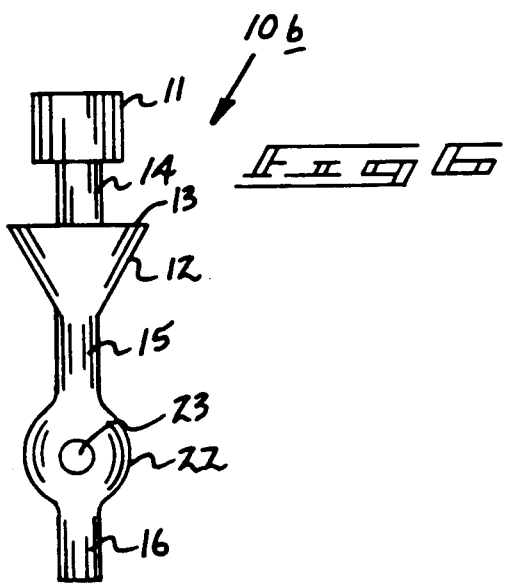
FIG. 6 is an orthographic view taken in elevation of a further modification of the instant invention.
Figure 7:
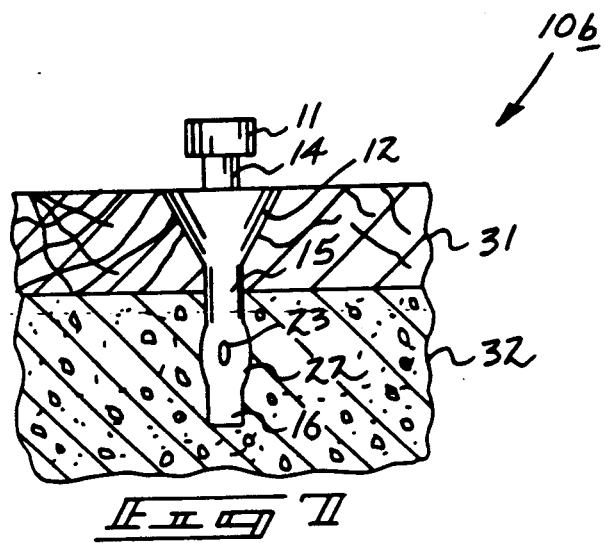
FIG. 7 is an orthographic view taken in elevation of the further modification of the instant invention in an operative configuration within a concrete substrate.

FIG. 6 illustrates a further modified concrete fastener 10b, wherein in lieu of the elliptical anchor member 17, a spherical projection 22 is mounted medially between the second and third cylindrical shanks 15 and 16 respectively. A through-extending cylindrical aperture 23 is directed orthogonally relative to the axis of the fastener 10b. In use, (see FIG. 7) the spherical projection 22 is deformable to assist in anchoring the fastener 10b within a concrete substrate 32. The cylindrical aperture 23 enhances the ability of the spherical projection 22 to collapse within the concrete substrate 33 and provide adequate room permitting this deformation to occur.

Figure 8:
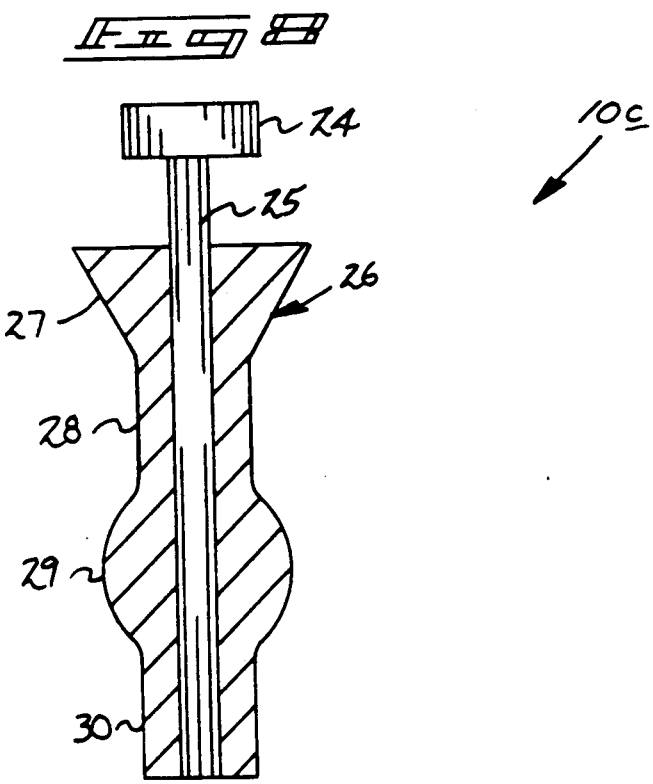
FIG. 8 is an orthographic view taken in elevation of a yet further modification of the instant invention.

FIG. 8 illustrates a yet further modified fastener 10c defined by a cylindrical first head 24, including a cylindrical body shaft 25 orthogonally mounted to a bottom surface of the head 24 formed of rigid steel and the like. A malleable aluminum anchor body 26 is formed about the body shaft 25 spaced below the head 24. The body 26 is defined by a truncated conical top head member 27 formed with a cylindrical center section 28 defining a diameter substantially two to three times that of the cylindrical body shaft 25, with a cylindrical lower section 20 coaxially aligned with the cylindrical center section 28 and the fastener, with a spherical anchor projection 29 formed medially of the center and lower sections 28 and 30.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A concrete fastener for assembling a support member to a concrete substrate, wherein the fastener comprises,
   an upper cylindrical first head member defined by a first head diameter, and
   a first cylindrical shank defined by a shank diameter integrally and coaxially mounted to a bottom surface of the first head member, and
   an inverted and truncated conical second head member integrally mounted to a lower terminal end of the first cylindrical shank, and
   a second cylindrical shank integrally and coaxially mounted to a lower terminal end of the second head member, wherein the second cylindrical shank is defined by a shank diameter, and
   an anchor means integrally and coaxially mounted to a lower terminal end of the second cylindrical shank for securement to the concrete substrate, and
   a third cylindrical shank coaxially aligned with and mounted to a lower terminal end of the anchor member, wherein the third cylindrical shank is defined by a shank diameter, and wherein the anchor means extends beyond the second and third cylindrical shanks, and
   wherein the conical second head member includes an upper annular surface spaced from and underlying the bottom surface of the first head member, and
   wherein the anchor means is defined by an elliptical projection extending beyond the second and third cylindrical shanks, and
   wherein the elliptical projection includes a concave elliptical recess formed on opposing sides of the elliptical projection to maintain geometrical integrity to the elliptical projection during enacting of the fastener through the support member, and
   wherein a lower terminal end of the third cylindrical shank terminates in a plurality of inverted truncated conical anchors, and including a further terminal conical anchor terminating in a lower pointed end, wherein the anchors are defined by anchor diameters extending beyond and greater than the shank diameter of the third cylindrical shank.

* * * * *